United States Patent [19]
Grimsdale

[11] Patent Number: 5,129,194
[45] Date of Patent: Jul. 14, 1992

[54] WEATHER STRIP

[76] Inventor: Kenneth W. Grimsdale, 2525 Havre des Iles, Suite 406-A, Chomedey, Laval, Quebec, Canada, H7W 4C4

[21] Appl. No.: 726,047

[22] Filed: Jul. 5, 1991

[51] Int. Cl.$^5$ ................................................. E06B 7/16
[52] U.S. Cl. .......................................... 49/493; 49/496
[58] Field of Search ................... 49/493, 494, 496, 475

[56] References Cited

U.S. PATENT DOCUMENTS

| | | | |
|---|---|---|---|
| 824,001 | 6/1906 | Etter . | |
| 1,489,195 | 4/1924 | Craig | 49/494 X |
| 1,675,844 | 7/1928 | Dennis . | |
| 1,683,564 | 9/1928 | Miller | 49/493 X |
| 1,728,120 | 9/1929 | Greene . | |
| 1,965,014 | 7/1934 | Trautvetter | 49/493 X |
| 2,040,133 | 5/1936 | Harnly . | |
| 2,070,725 | 2/1937 | Gail . | |
| 2,612,664 | 10/1952 | Sidden . | |
| 2,724,876 | 11/1955 | Chagnon | 49/494 |
| 2,793,070 | 5/1957 | Wernig . | |
| 2,801,450 | 8/1957 | Funke . | |
| 3,131,441 | 5/1964 | Cornell . | |
| 3,142,098 | 7/1964 | Oehmig | 49/493 X |
| 3,535,824 | 10/1970 | Kessler . | |
| 3,564,773 | 2/1971 | Bonnaud . | |
| 3,987,587 | 10/1976 | Miller | 49/493 |
| 4,312,153 | 1/1982 | Parkinson et al. . | |
| 4,419,844 | 12/1983 | Kreisfeld . | |

FOREIGN PATENT DOCUMENTS

| | | | |
|---|---|---|---|
| 733224 | 10/1932 | France | 494/ |
| 599939 | 3/1948 | United Kingdom | 49/494 |

*Primary Examiner*—Philip C. Kannan
*Attorney, Agent, or Firm*—ROBIC

[57] ABSTRACT

The weather strip is designed for sealing a gap between a door frame and a door mobile across the door frame, and comprises an elongate base member having a flat bottom surface for flush mounting on a door frame, and two sides, as well as a uniform thickness rubber strip to be held by the base member. A first one of the two sides is folded over for crimping the rubber strip between the first side and the bottom surface or a second one of the two sides, the rubber strip projects away from the base member and is directed on one side by an edge of the first side and on another side by an edge of a second one of the two sides, and the edge of the one side and the edge of the second side are rounded with a radius of curvature greater than a minimum elastic radius of curvature of the rubber strip. When the rubber strip is flipped back and forth as a result of coming into contact with a two-way door frame, the rubber strip is not torn by the flipping action.

5 Claims, 2 Drawing Sheets

WEATHER STRIP

FIELD OF THE INVENTION

The present invention relates to a weather strip for sealing a gap between a door frame and a door mobile across the door frame. The invention relates further to a weather strip for dock levellers and overhead doors.

BACKGROUND OF THE INVENTION

Weather strips comprising elongate base members which hold flat rubber strips to act as an air seal to provide a weather strip are well known in the art. For example, U.S. Pat. No. 2,612,664 to SIDDEN describes a weather strip for storm doors in which a strip of rubber is held within a metal base member which has a simple construction of a folded sheet of metal. Other weather strip constructions are known in which the rubber strip is specially formed to have a base portion which is wider, the base portion is then attached to a door frame using a bracket which secures the base portion of the rubber strip to a frame of the door to be sealed. An example of such a weather strip is disclosed in U.S. Pat. No. 4,312,153 to PARKINSON et al.

The prior art weather strips function well for one-way doors which are provided with a stop such that the rubber strip of the weather strip comes into contact with a portion of the door frame from only one direction. Conventional weather strips fail to be durable when used as weather strips for two-way doors in which the rubber strip flaps against the portion of the door frame in such a way that it flexes in both directions. It has been found that conventional weather strips have a tendency to tear as a result of the action of the rubber strip being flipped back and forth during two-way door movement while the rubber strip is held within its elongate base member. Although it is possible to use more sophisticated rubber sealing strip constructions, for example as disclosed in U.S. Pat. No. 4,419,844 to Kreisfeld or in the above-mentioned U.S. Pat. No. 4,312,153 where the wider base of the rubber strip is adapted to be fitted within a bracket such that flexion of the rubber strip does not cause a tearing of the rubber strip. such specially manufactured rubber strips are more costly to manufacture as a result of their use of materials and method of production.

In the case of dock levellers, it has been found that weather strips placed between the levellers and the surrounding truck loading bays deteriorate rapidly, usually as a result of a tearing or guillotine action on the weather strip as the leveller moves bidirectionally up or down with respect to the surrounding bay.

In the case of overhead doors, it has been found that weather strips placed across the top of truck docking bay doors are rapidly worn out by tearing since the weather strip is moved in two directions as the door moves up and down. The same deterioration, as a result of a tearing or guillotine action, accurs, especially when the flexible material of the weather strip becomes brittle in very cold weather.

In every case, maintaining a good seal in the weather strip is both important for heating or air conditioning energy conservation and for hygiene by keeping insects out. Effective weather strips in dock bays of warehouses represent significant energy savings.

SUMMARY OF THE INVENTION

It is therefore an object of the present invention to provide a weather strip for sealing a gap between a door frame and a door mobile across the door frame which uses a simple flat rubber strip held by an elongate base member which holds the rubber strip in such a fashion that when the rubber strip is flipped back and forth as a result of coming into contact with the door frame, that the rubber strip is not torn by the flipping action.

According to the invention there is provided a weather strip for sealing a gap between a door frame and a door mobile across the door frame, comprising: an elongate base member having a flat bottom surface for flush mounting on a door frame, and two sides; and a uniform thickness rubber strip to be held by the base member; wherein a first one of the two sides is folded over onto a second one of the two sides or the bottom surface for crimping the rubber strip therebetween; the rubber strip projects away from the base member and is directed on one side by an edge of the first side and on another side by an edge of a second one of the two sides; and the edge of the one side and the edge of the second side are rounded with a radius of curvature greater than a minimum elastic radius of curvature of the rubber strip.

Preferably the edge of the first side may be positioned along a middle of the bottom surface, and the second side may be upstanding from the bottom surface at approximately a right angle with the edge of the second side remote from the bottom surface. The base member may be formed from a metal strip having 180° folds along its sides in order to provide the rounded edges of the first and second sides. The metal strip may also be folded along its first side inwardly such that the rubber strip is crimped by the edge of the first side which may act as a barb in preventing removal of the rubber strip when the rubber strip is crimped by the first side and the bottom surface.

Also, the second side may preferably project from the bottom surface at approximately a right angle, and the first side may have a portion near the edge of the first side substantially parallel to and adjacent to the second side, the rubber strip being crimped between the portion of the first side and the second side as well as between the first side and the bottom surface.

BRIEF DESCRIPTION OF THE DRAWINGS

Other objects and features of the present invention will become better understood by way of the following detailed description of the preferred embodiments with reference to the appended drawings, in which.

DETAILED DESCRIPTION OF THE PREFERRED EMBODIMENTS

Figures 1, 2:
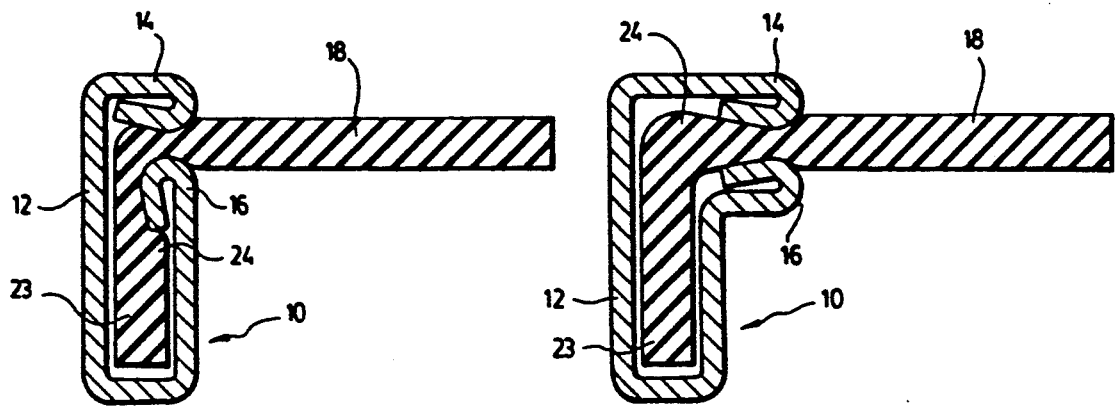
FIG. 1 is a side cross-sectional view of a first preferred embodiment.
FIG. 2 is a side cross-sectional view of a second preferred embodiment according to the invention.
Figure 5:
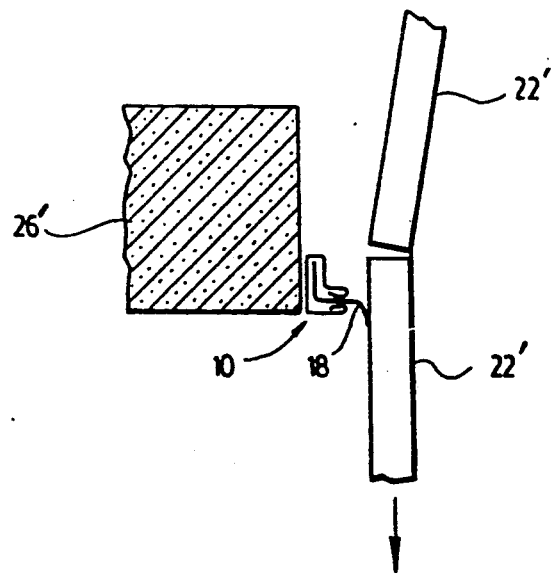
FIG. 5 shows a cross-sectional view of an overhead docking bay door frame and door being closed with the second preferred embodiment sealing the gap between the frame and the door.

As shown in FIG. 1, the weather strip according to the invention has a base member (10) which holds a rubber strip (18). The rubber strip (18) is a flat strip of flexible rubber of uniform thickness which is held by base member (10) on one side leaving its other side free to make moveable contact with a door edge. Base member (10) has a first side (16) which is folded over to pinch side (23) of rubber strip (18) Base member (10) is made from a sheet of bendable stainless metal with the ends of sides (16) and (14) folded 180° inwardly to provide rounded edges. As side (16) is folded down to crimp strip (18), a bulge (24) in strip (18) is formed which prevents strip (18) from being easily removed from base member (10). Side (14) is shown folded upright at about 90° in order to hold strip (18) in a substantially upright position. Since the ends of sides (16) and (14) provide rounded edges, then as strip (18) is flipped back and forth when making contact with a door (22') mobile across the door frame (26), as shown in FIG. 5, the rubber strip (18) is not subjected to any dangerous cutting forces since the curvature of the ends of sides (16) and (14) is larger than a minimum elastic radius of curvature of rubber strip (18).

As shown in FIG. 2, the base member (10) in the second preferred embodiment is formed by folding a metal strip with ends of sides (14) and (16) folded inwardly 180° in order to provide a rounded edge about which strip (18) can be flipped back and forth as the strip (18) comes in contact with a moving door (22'). Side (23) of strip (18) is lodged inside the folded metal strip (10) on its bottom part (12). The first side (16) is initially folded over the bottom (12) and then has a portion extending at roughly right angles to base portion (12) such that the portion of side (16) is parallel to side (14) of member (10). The edges of sides (14) and (16) act as barbs for holding resilient strip (18) in place.

Figure 3:
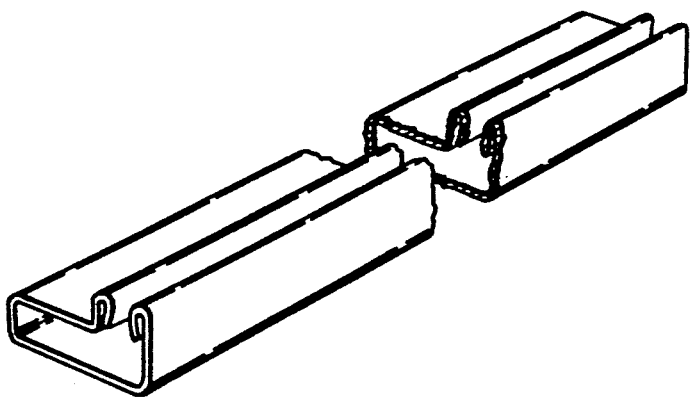
FIG. 3 shows a perspective view of the second preferred embodiment.

FIG. 3 shows an oblique view of the second preferred embodiment.

Figure 4:
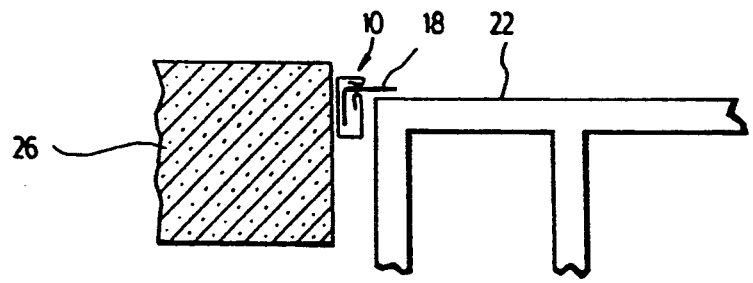
FIG. 4 shows a cross-sectional view of the first preferred embodiment installed on a docking bay and ready for contact with a dock leveller edge.

FIG. 4 shows the weather strip according to the first preferred embodiment mounted on a docking bay frame (26) and coming into contact with a dock leveller (22). As dock leveller (22) moves up, strip (18) is caused to roll over the end of side (14), and as leveller (22) moves back down, strip (18) is caused to roll over the end of side (16). Strip (18) is able to be flipped back and forth without tearing or being guillotined due to the rounded edges of sides (14) and (16). Base member (10) is preferably spot welded to a metal side of bay (26).

FIG. 5 shows a cross-sectional view of the second preferred embodiment installed on an overhead door frame (26') of a docking bay, in which a gap between vertical sliding door (22') and frame (26') is sealed by the weather strip according to the second preferred embodiment. Rubber strip (18) is shown deflected downwardly since the movement of door (22') is shown to be moving downwardly towards a closed position. Of course, if door (22') is opened, rubber strip (18) will be flipped in the opposite direction to point upwardly keeping a constant seal against door (22'). Rubber strip (18) will roll back and forth over sides (14) and (16) without being cut or guillotined and without being pulled from base member (10) due to the barb action of the inward folds of sides (14) and (16) which crimp the strip (18) in place. Base member (10) may be mounted to door frame (26') using a nail gun capable of piercing through the lower portion of side (16) and bottom (12) of base (10), or by other suitable fastening means. In the case that door frame (26') is made of metal construction, the metal base member (10) may be spot welded to frame (26).

Although the base member has been described in the preferred embodiments as comprising a folded metal strip, it is of course possible to form a suitable base member with rounded edges using a plastic material which is able to securely hold a flat strip of rubber (18) as required.

What is claimed is:

1. A weather strip for sealing a gap between a door frame and a door mobile across the door frame, comprising:
   an elongate base member having a flat bottom surface for flush mounting on a door frame, and two sides; and
   a uniform thickness rubber strip held by the base member; wherein;
   a first one of said two sides is folded over said bottom surface for crimping the rubber strip therebetween:
   the rubber strip projects away from the base member and is directed on one side by an edge of said first side and on another side by an edge of a second one of said two sides; and
   said edge of said first side is provided with a step, and said edges of said first and second sides are rounded with a radius of curvature greater than a minimum elastic radius of curvature of the rubber strip, to provide a barb-like constriction on the rubber strip held by the base member, while allowing a free end of the rubber strip to roll over both said rounded edges without being cut.

2. The weather strip as claimed in claim 1, wherein said edge of said first side is positioned along a middle of said bottom surface, and said second side is upstanding from said bottom surface at approximately a right angle.

3. The weather strip as claimed in claim 2, wherein said base member is formed from a metal strip having 180° folds along its sides in order to provide said rounded edges of said first and said second sides, and said metal strip is folded along said first side inwardly such that the rubber strip is crimped by said edge of said first side which acts as a barb in preventing removal of the rubber strip when the rubber strip is sandwiched between said first side and said bottom surface.

4. The weather strip as claimed in claim 1, wherein said second side projects from said bottom surface at approximately a right angle, and said first side has a portion near said edge of said first side substantially parallel to and adjacent said second side, the rubber strip being sandwiched between said portion of said first side and said second side as well as between said first side and said bottom surface.

5. The weather strip as claimed in claim 4 wherein the base member is made of a metal strip whose sides are folded inwardly approximately 180° to provide said rounded edge of said first and said second sides.

* * * * *